(12) United States Patent
Price et al.

(10) Patent No.: US 9,714,548 B2
(45) Date of Patent: Jul. 25, 2017

(54) APPARATUS FOR SINGLE DEGREE OF FREEDOM INERTIAL MEASUREMENT UNIT PLATFORM RATE ISOLATION

(71) Applicants: Timothy M. Price, Templeton, CA (US); Cory Wilson, San Luis Obispo, CA (US); Christopher Thomas Koplan, Atascadero, CA (US)

(72) Inventors: Timothy M. Price, Templeton, CA (US); Cory Wilson, San Luis Obispo, CA (US); Christopher Thomas Koplan, Atascadero, CA (US)

(73) Assignee: FLEXIT AUSTRALIA PTY LTD., Osborne Park (AU)

( * ) Notice: Subject to any disclaimer, the term of this patent is extended or adjusted under 35 U.S.C. 154(b) by 895 days.

(21) Appl. No.: 13/974,333

(22) Filed: Aug. 23, 2013

(65) Prior Publication Data
US 2015/0052988 A1 Feb. 26, 2015

(51) Int. Cl.
E21B 49/00 (2006.01)
E21B 47/024 (2006.01)
G01C 21/16 (2006.01)
E21B 17/10 (2006.01)

(52) U.S. Cl.
CPC ........ *E21B 17/1078* (2013.01); *E21B 47/024* (2013.01); *E21B 49/003* (2013.01); *G01C 21/16* (2013.01)

(58) Field of Classification Search
CPC .. E21B 47/024; E21B 49/003; E21B 17/1076; G01C 21/16
See application file for complete search history.

(56) References Cited

U.S. PATENT DOCUMENTS

| 1,542,647 | A |   | 9/1985 | Molnar |        |
|-----------|---|---|--------|--------|--------|
| 4,987,684 | A | * | 1/1991 | Andreas | G01C 21/16 33/304 |
| 5,331,578 | A |   | 7/1994 | Stieler |        |
| 5,396,326 | A | * | 3/1995 | Knobbe  | G01C 21/16 33/321 |
| 5,442,560 | A | * | 8/1995 | Kau     | G01C 21/16 701/502 |
| 6,315,062 | B1 |  | 11/2001 | Alft et al. |  |
| 6,453,239 | B1 | * | 9/2002 | Shirasaka | E21B 47/022 175/45 |
| 6,719,069 | B2 |  | 4/2004 | Alft et al. |  |
| 6,778,908 | B2 | * | 8/2004 | Martorana | G01V 11/002 702/9 |
| 7,823,661 | B2 |  | 11/2010 | Mintchev et al. |  |

(Continued)

FOREIGN PATENT DOCUMENTS

CN 201865663 U 6/2011
WO 2011146988 A1 12/2011

*Primary Examiner* — John Fitzgerald
(74) *Attorney, Agent, or Firm* — Felix L. Fischer

(57) ABSTRACT

A borehole logging instrument sonde employs a case in which support electronics including a processor are mounted. A rotatable platform is mounted within the case and carries an inertial measurement unit (IMU) and a roll axis gyroscope. A motor is adapted to rotate the rotatable platform within the case. The processor receives an input from the roll axis gyroscope and provides an output to the motor responsive to the input for control of rotation of the platform to space stabilize and isolate the IMU from the roll of the instrument sonde.

22 Claims, 8 Drawing Sheets

(56) References Cited

U.S. PATENT DOCUMENTS

| | | | |
|---|---|---|---|
| 2003/0236628 A1* | 12/2003 | Martorana | G01V 11/002 702/9 |
| 2005/0022402 A1* | 2/2005 | Ash | G01C 21/16 33/321 |
| 2010/0296100 A1 | 11/2010 | Blacklaw | |

* cited by examiner

APPARATUS FOR SINGLE DEGREE OF FREEDOM INERTIAL MEASUREMENT UNIT PLATFORM RATE ISOLATION

BACKGROUND INFORMATION

Field

Embodiments of the disclosure relate generally to the field of oil, mining and water well logging systems and more particularly to a system incorporating an inertial measurement unit (IMU) platform incorporating a single axis gyroscope for measurement of rotation of the platform with an associated control system and motor to stabilize the platform thereby allowing reduction in the required dynamic range of the measurement gyroscopes in the IMU which in turn improves the measurement accuracy at low rates.

Background

Navigational measurement or "logging" of oil and water wells is of significant importance in modern drilling technology. Boreholes, particularly in directional drilling applications will vary significantly in angle and direction. Identifying the actual location and shape of a borehole may be critical and logging has been developed to accommodate that requirement. Typical logging systems employ inertial navigation devices incorporated in an instrument sonde which traverses the borehole. Two classes of inertial navigation system (INS) are well known. A platform inertial navigator uses mechanical gimbals and gyroscopes to space stabilize and maintain a set of accelerometers pointed in a constant frame of reference so that the direct double integration of the accelerometer measurements result in the position measurement of the body in motion relative to its initialize position. The attitude or Roll, Pitch and Yaw can be measured directly by the gimbal angles given the gimbal angles were aligned properly at the start of travel. A second class of INS is the strap down inertial navigator which eliminates the complexity of the mechanical gimbals using a set of gyroscopes to simply measure the Roll, Pitch and Yaw using the gyro derived angle measurements to mathematically translate the acceleration measurement into the frame of reference for double integration resulting in position. Some inertial systems designated Attitude Reference Systems (ARS) measure only attitude whiles the INS measures both the attitude and the position of the body in motion.

Each of these methods have certain advantages and disadvantages but typically the strap down system hardware is much simpler and lower cost while the computer programs and mathematics are more complex than a platform system. The gyroscopes used in a strap down system must be able to measure very large rates of motion when the body is moving and also very small rates of motion when the INS measures the Earth's spin rate in the process of finding its initial attitude. The ability to measure both small rates as well as high rates with the same device implies a very large dynamic range of measurement. Typically, the accuracy of the measurement made by a sensor is inversely proportional to the dynamic range of the device so a device that can measure very high rates has a difficult time measuring very low rates very precisely and accurately.

In the oil and mining industry, both platform and strap down systems have been developed and used commercially to survey and map the path of a borehole. Platform systems are not in wide spread application primarily due to their large diameter which limits their use to very large diameter boreholes. Strap down INS systems are more readily used in the industry but are still limited because of either size or accuracy limitations. The large gyros that are necessary for the highest accuracy systems make the systems too large for most applications. Systems employing small gyroscopes suffer from accuracy limitation due to the small size of the gyroscopes made worse by the large dynamic range required for strap down navigation mechanizations.

It is therefore desirable to provide a logging system which may employ small size gyroscopes in both ARS system as INS systems while improving accuracy of navigation.

SUMMARY

Embodiments disclosed herein provide a borehole logging instrument sonde having a case in which support electronics including a processor are mounted. A rotatable platform is also mounted within the case and carries an inertial measurement unit (IMU) and a roll axis gyroscope. A motor is adapted to rotate the rotatable platform within the case. The processor receives an input from the roll axis gyroscope and provides an output to the motor responsive to the input for control of rotation of the platform to space stabilize and isolate the IMU from the roll of the instrument sonde.

The embodiments disclosed provide a method for operation of a logging instrument sonde by mounting the IMU on a rotatable platform suspended on bearings in an instrument sonde. A roll axis gyroscope is mounted on the platform and provides an input to a processor. A motor is driven with an output from the processor responsive to the roll axis gyroscope input for rotation of the platform providing space stabilization and isolation of an IMU from the roll of the instrument sonde.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide an apparatus that reduces the required roll axis dynamic range of an Inertial Measurement Unit (IMU) providing higher IMU stability and accuracy at the lower range of operations. Using a high bandwidth high dynamic range MicroElectroMechanical Systems (MEMS) gyroscope oriented in the roll axis of a navigation instrument sonde for control, an inertial platform in the sonde is space stabilized by a motor responsive to the MEMS gyrocope thereby isolating a high accuracy, low dynamic range and bandwidth IMU from roll axis disturbances. In this embodiment, the MEMS gyroscope bandwidth is 1000 Hz while the IMU bandwidth is approximately 50 Hz. The embodiments described herein combine a low cost, low precision, high dynamic range MEMS device with the low range high precision IMU resulting in a system that can operate in environments where high roll rates of the sonde are present without the loss of the precision and accuracy normally associated with a wide dynamic range IMU required by such applications.

Figure 1A:
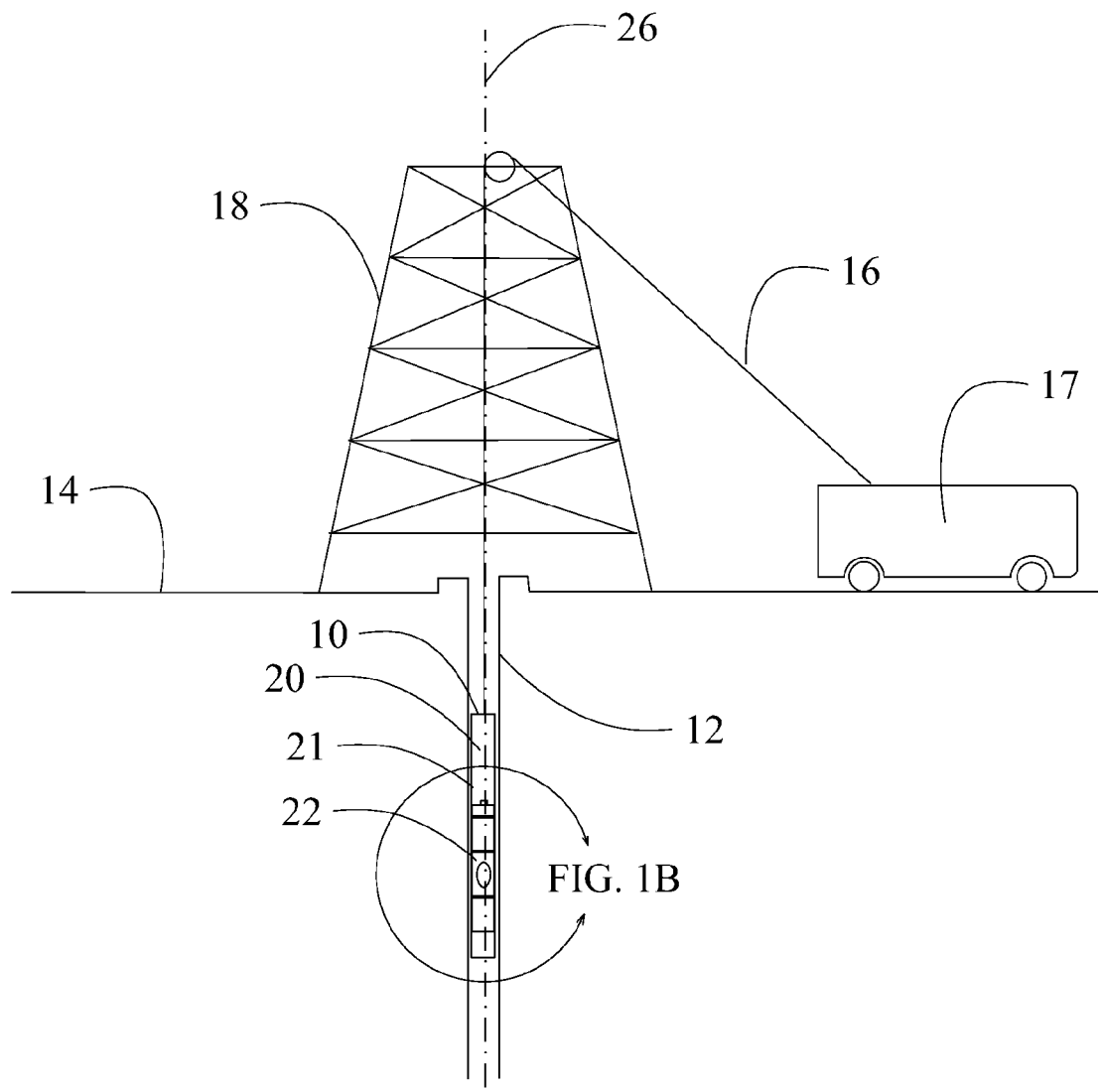
FIG. 1A is a diagram of an instrument Sonde traversing a borehole suspended on a wireline.
Figure 1B:
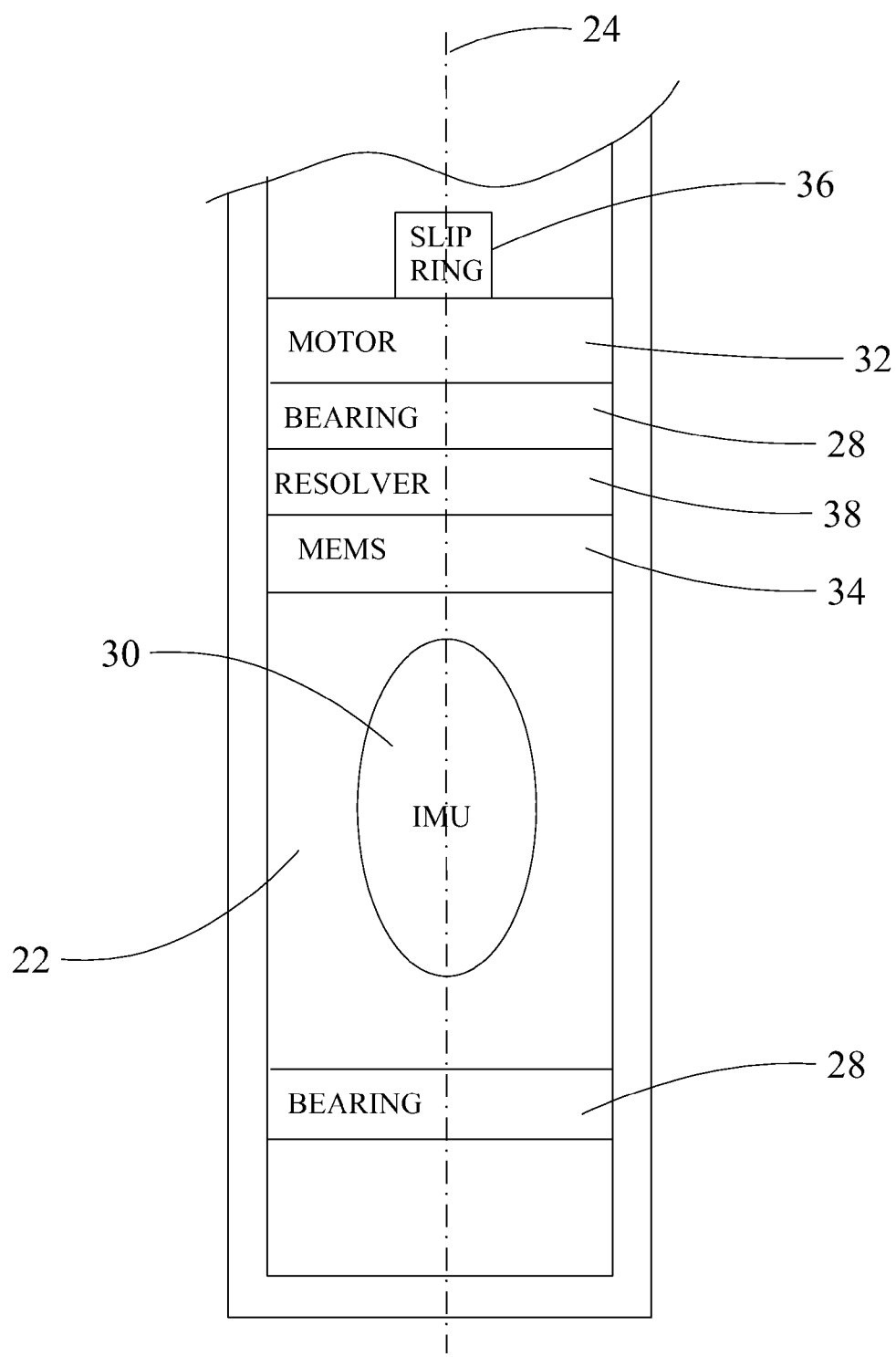
FIG. 1B is a detailed view showing major components of the Sonde.

Referring to the drawings, FIG. 1A shows an instrument sonde 10 incorporating support electronics 20 and a rotating platform 22 within a sonde case 21 traveling down a borehole 12 below ground level 14. The instrument sonde 10 is shown conveyed on a wireline 16 supported by a derrick 18 although alternative means of conveyance are possible including mounting within a drilling assembly, a tractor assembly, coiled tubing or simply conveyed by gravity when dropped down the borehole. As represented in schematic form in FIG. 1B, a rotating platform 22, carried within the case that provides a mount for an Inertial Measurement Unit commonly known as an IMU 30. The platform 22 is free to rotate about a tool axis 24 nominally parallel to the borehole axis 26 (seen in FIG. 1A) through bearings 28. A motor 32 provides a means to control rotation of the platform 22 about the tool axis 24 parallel to the borehole axis 26. While the portion of the borehole shown in the drawings is perpendicular to ground level and straight, it is understood that, over the total length of the borehole, angle and direction will change which provides the reason for logging of the hole.

A single axis MEMS gyroscope 34, such as the ADXRS646 available from Analog Devices Inc, is mounted with a measurement axis nominally aligned with an axis of rotation of the platform, typically coincident with the tool axis 24, such that it measures the rate of rotation of the platform 22. An electric slip ring 36 allows electrical connections between the platform mounted IMU 30 and MEMS 34 and the support electronics 20 in the sonde case 21. A resolver 38 measures a relative angle 27 between the sonde case 21 with the support electronics 20 and the rotating platform 22 as represented in FIG. 2A.

Figure 2A:
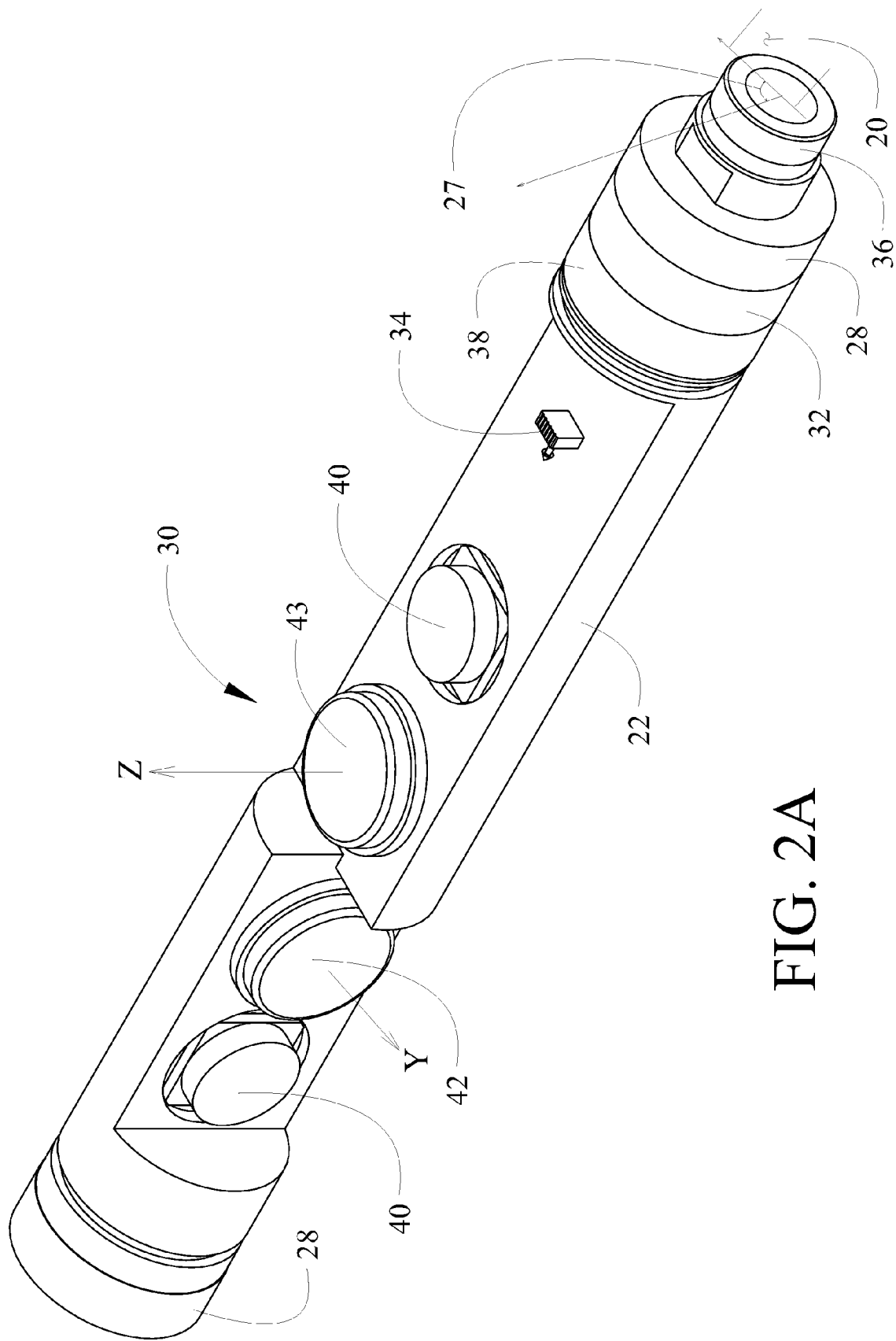
FIGS. 2A, 2B and 2C are an isometric diagram of a rotating sensor platform, a section view and side view of the platform.
Figure 2B:
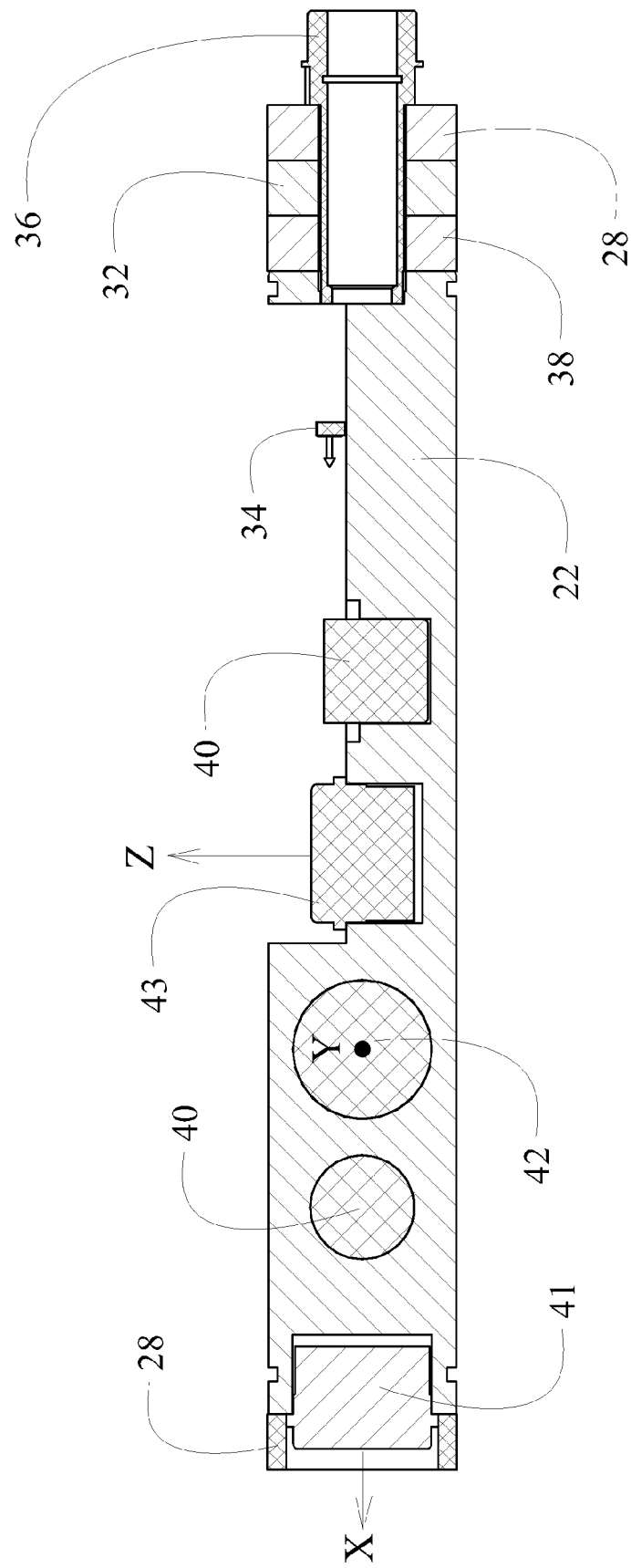
Figure 2C:
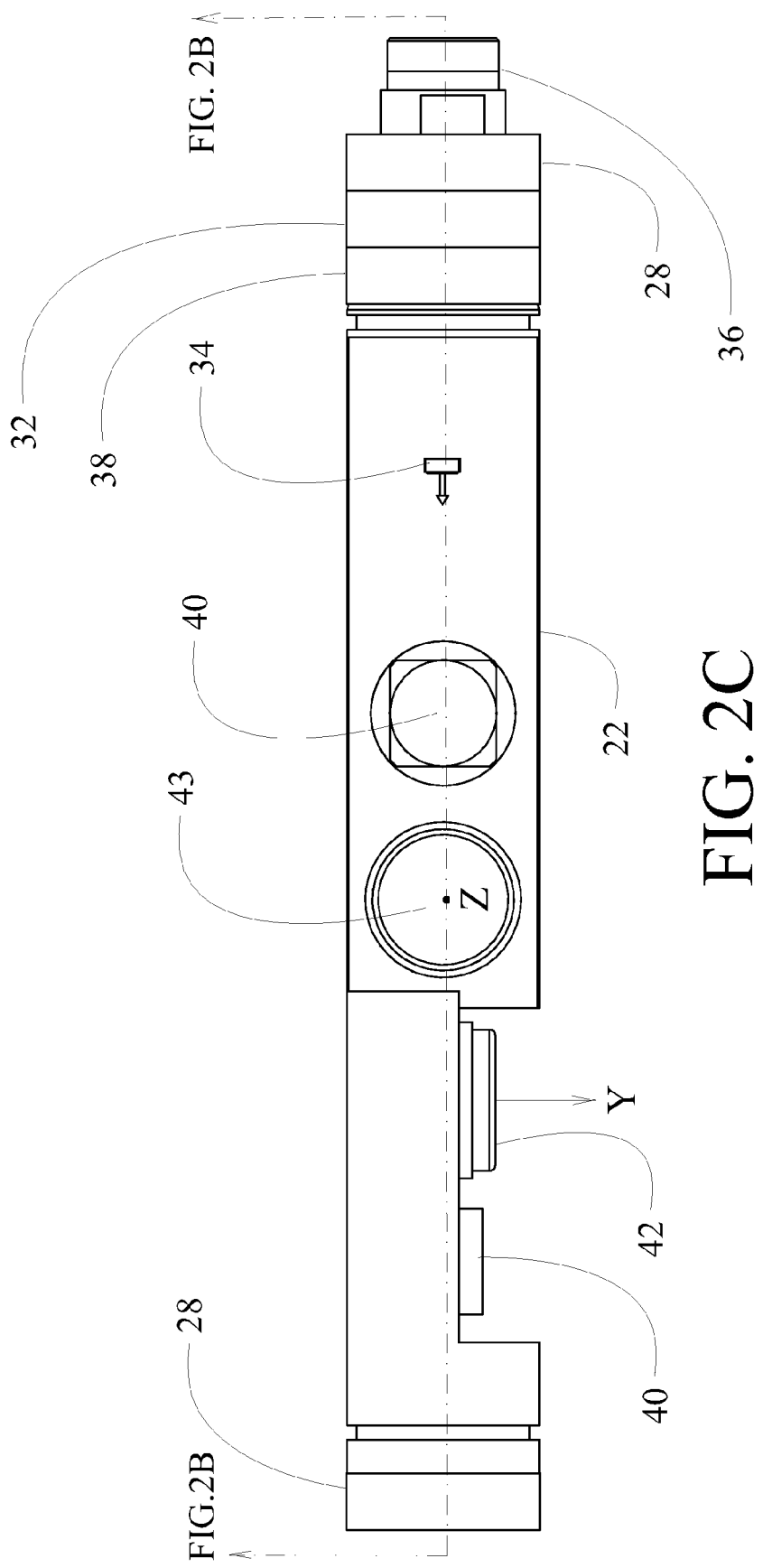

FIGS. 2A, 2B and 2C show an example configuration of platform 22 incorporated in the sonde 10. Incorporated in the IMU 30 are two dynamically tuned gyroscopes 40 mounted orthogonally on the rotating platform 22. The gyroscopes 40 provide four rate measurements that are used to resolve rotation rate and angle about each of the axis of the platform known as body axes, X, Y and Z, for navigation (logging) measurements within the borehole 12. Three accelerometers 41, 42 and 43 are mounted for measurement of acceleration along the X, Y and Z body axes of the rotating platform 22. In the embodiment shown, the sensors specified in the IMU 30 are two Northrop Grumman G2000 dynamically tuned gyroscopes and three Japan Aviation Electronics JA-5M36 quartz flexure accelerometers. Those skilled in the art of inertial guidance will recognize that in alternative embodiments virtually any type of gyroscope or accelerometer of sufficient precision can be used including single degree of freedom rate gyros, rate integrating gyroscopes, fiber optic gyros, ring laser gyros, MEMS gyroscopes and MEMS accelerometers without affecting or limiting the present invention. The selection of the most appropriate combination of sensors depends on the size, accuracy and cost objective of the navigation system.

Figure 3:
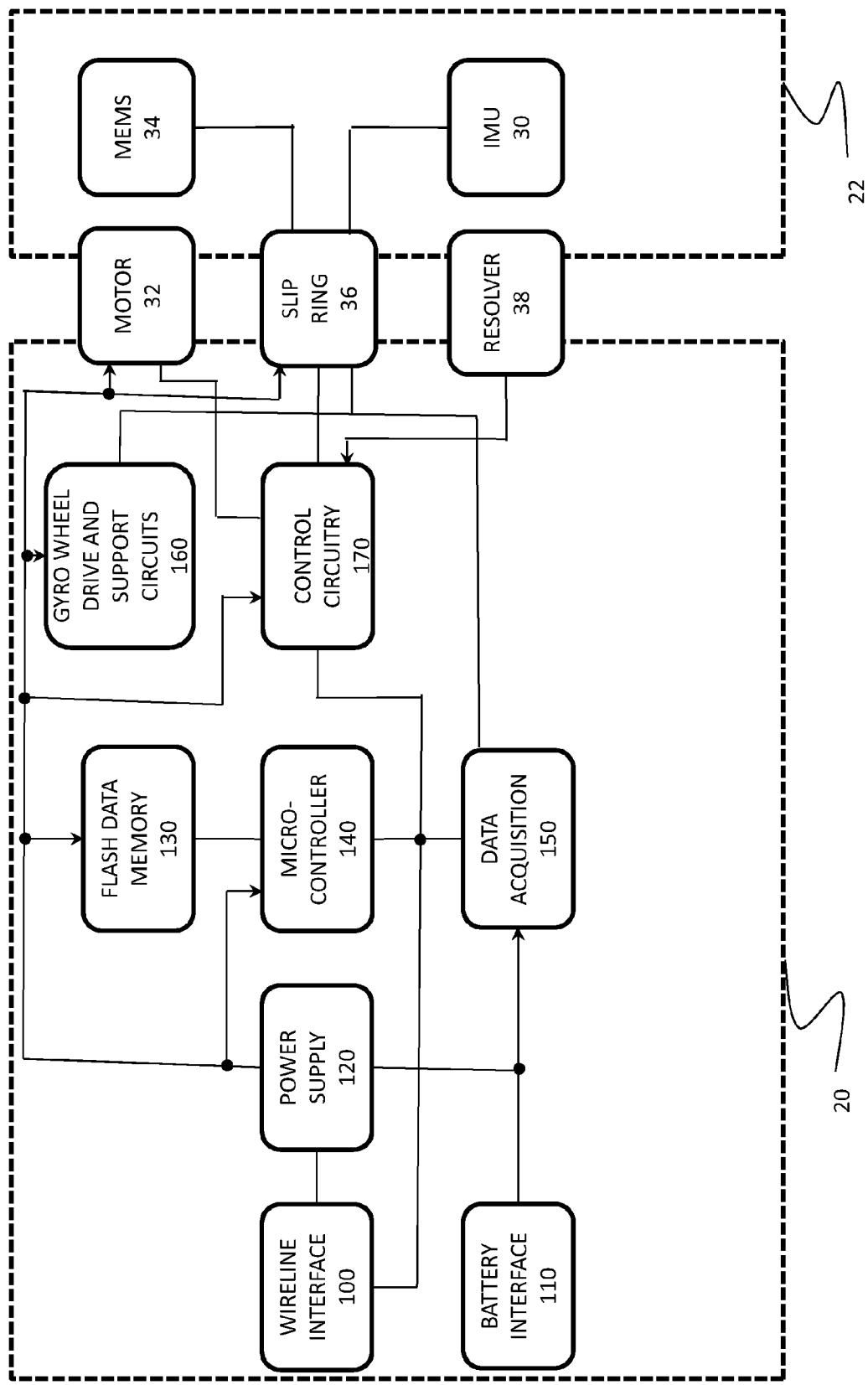
FIG. 3 is a block diagram showing the hardware elements of the Sonde.

FIG. 3 provides a block diagram of the support electronics 20 and the operating elements of rotating platform 22. A wireline interface circuit 100 provides both the communication interface and power interface to the wireline 16. The communication interface connects to the wireline providing both a receiver and transmitter used to communicate to an earth's surface readout computer 17 located in a logging van or similar location, as shown in FIG. 1A, or other modules that may be in the borehole. A number of modulation methods may be used for communication over the wireline such as Phase Shift Keying, Frequency Shift Keying, pulse position modulation and pulse width modulation methodologies.

A battery interface 110 provides the connection and power conditioning for applications that require battery power such as Drop Surveys, Measurement While Drilling Application as well as any special application where the instrument cannot be powered from the surface through a wireline. A power supply 120 converts input power from either or both the wireline interface 100 and the battery interface 110 for conversion to voltages required to run the system electronic circuitry and sensors.

A flash memory 130 or other non-volitile memory provides storage of high resolution sensor data allowing surveys to be post processed at the surface after the sonde is removed from the well. This feature makes data quality analysis possible as well as the application of advanced processing techniques that cannot be practically performed in real time.

A data acquisition system 150 provides the means to convert sensor data collected from the IMU 30 into a digital form for both storage in memory and real time processing. Gyro wheel drive and support circuits 160 are employed for embodiments that use spinning wheel gyroscopes in the IMU such as dynamically tuned gyroscopes, rate Gyroscopes or rate integrating gyroscopes. The circuitry primarily provides drive waveforms required for the motors that are integral to the gyroscopes typically but not limited to hysteresis synchronous motors or induction type motors.

Platform control circuitry 170 controls the rotating platform 22 using the MEMS gyroscope 34, resolver 38, and IMU sensor outputs as input to monitor and control platform rotation rate and absolute angle respectively, as will be described in greater detail subsequently. In addition, the platform control circuitry 170 communicates and responds to commands received from a microcontroller 140. Microcontroller 140 controls the movement of data, collecting IMU 30 sensor data through the data acquisition system 150 applying thermal corrections for the IMU's gyroscopes and accelerometers and then propagating the corrected sensor measurements through a navigation algorithm. The resulting navigation data is communicated to the surface readout 17 previously depicted in FIG. 1A via the wireline interface 100 in real time while the raw sensor and temperature data is written to the flash data memory 130 for storage and later processing. INS aiding is implemented via a Kalman filter estimating algorithm also computed within the microcontroller 140 or alternatively wholly or partially computed within the earth's surface readout computer 17.

For the embodiment shown with the support electronics 20 mounted off the platform 22 all electrical connection between the support electronics 20 and the Platform mounted MEMS 34 and IMU 30 are made through the Slip Ring 36.

Figure 4:
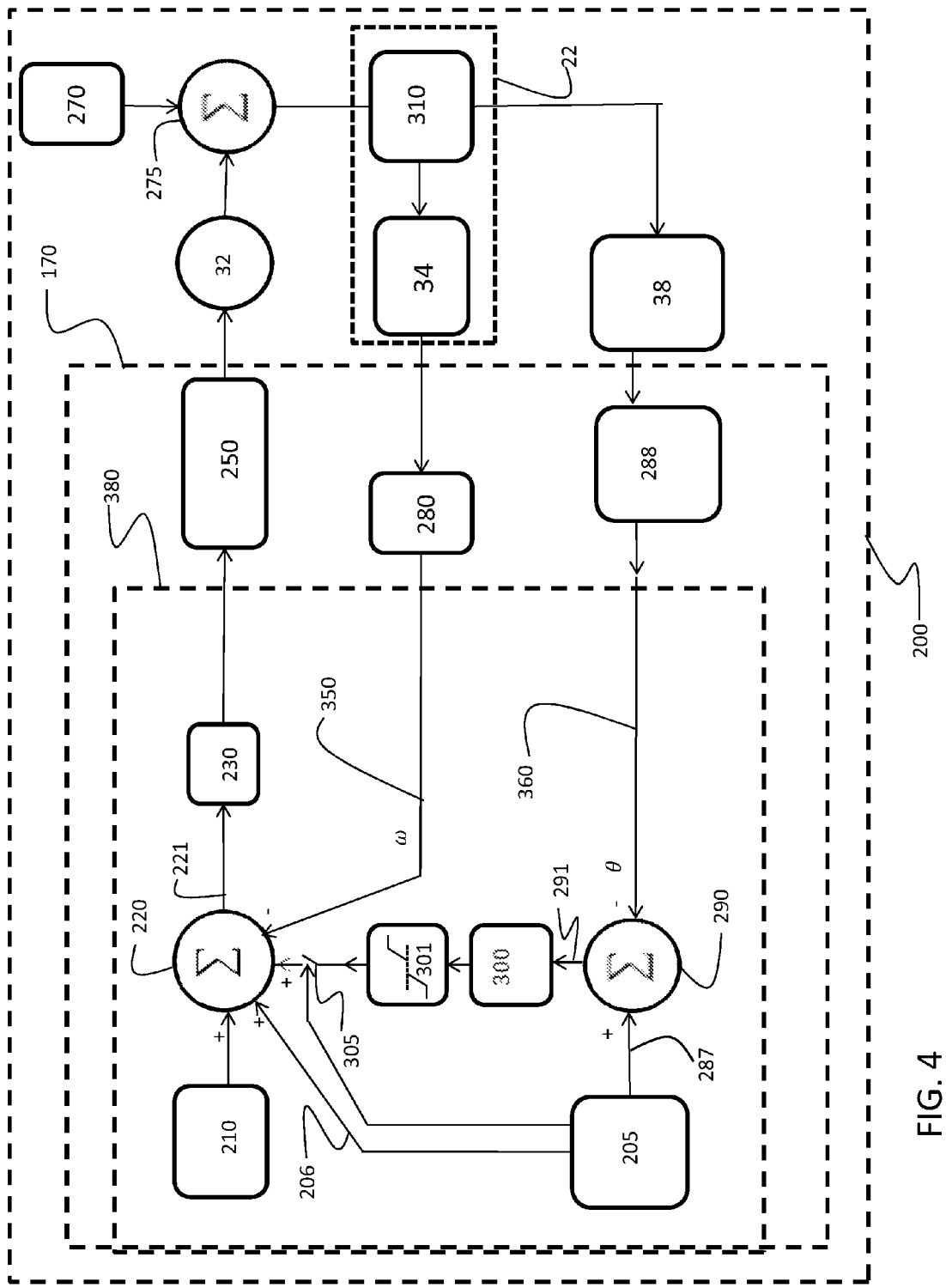
FIG. 4 is a functional block diagram of the platform rate control and angle control processing.

As shown in a functional representation in FIG. 4, a platform control system 200 employs the platform control circuitry 170, motor 32, resolver 38, the MEMS gyroscope 34 to control rotation of rotating platform 22. The platform control circuitry 170 performs two functions. First, isolating the IMU 30 from high roll rates typical of surveying or drilling boreholes by employing the motor 32 to provide rotational input to the platform 22 to substantially eliminate rotation that would be induced by the instrument sonde 10 in which the platform is contained. Isolating the IMU from high roll rates allows rate measurement range of the IMU to be reduced which in turn enables better initial system attitude alignment and lower rate measurement drift instability. Second, the platform control circuitry 170 can rotate the rotating platform 22 with the mounted IMU 30 at a controlled rate through precise angles such that the residual gyroscope and accelerometer measurement errors in the IMU can be observed and corrected during the survey process.

The platform control system 200 incorporates two feedback controls. First, a rate control feedback 350 is employed to control the rate of rotation of the platform with respect to inertial space while an angle feedback 360 is employed to control the absolute angular position of the rotating platform 22 with respect to a predefined reference scribe on the case 21 of the instrument sonde 10.

Incorporated in the platform control circuitry 170 is a platform processor 380 such as a microcontroller, microprocessor, field programmable gate array or other well-known digital or analog circuit, providing the basic communication interface, summing node, dynamic and steady state control compensation for both the rate control feedback 350 and angle feedback 360. Rate summing node 220 computes an error signal 221 that drives the feedback loops and sums a command rotation rate 206 from the microcontroller 140, (seen in FIG. 3) received through a microcontroller interface 205, a MEMS gyro bias offset 210, a compensated position feedback difference signal 301, to be described in greater detail subsequently, and the rate control feedback 350 signal.

The command rotation rate 206 applied by the platform processor 380 is computed by the microcontroller 140 to obtain a substantially zero rotation rate of the platform to space stabilize and isolate the IMU 30 from the roll of the instrument sonde 10 as it travels down the borehole 12. Alternatively, a small command rate selected by the microcontroller 140 through microcontroller interface 205 may be applied to the summing node to produce a slow constant rotation of the IMU sensors with respect to gravity and the spin rate of the earth used as a means to enhance estimation of IMU sensor errors using Kalman filters.

The MEMS gyro bias offset 210, predetermined empirically by experimentation is applied at the rate summing node 220 to offset any bias error of the MEMS Gyro 34 that may otherwise cause an unwanted platform rotation. The MEMS gyro bias offset 210 can be determined by measuring the open loop MEMS gyro output or by tracking the long term integrated angle of the IMU roll axis gyroscope. Using the roll axis IMU gyroscope to control MEMS gyroscope offset correction provides a means of correcting the MEMS low frequency drift to the higher precision IMU gyroscope while also using the advantage provided in terms of high bandwidth of the MEMS gyroscope.

The resulting error signal 221 computed by the rate summing node 220 is processed by a rate compensator 230 tuned to set the dynamic response and stability of the rate loop. The output of the rate compensator 230 is passed through a motor drive circuit 250 driving the motor 32 which the torques the platform 22. Torque summing node 275 represents the physical result of the process that sums the torque applied by the Motor 32 to platform 22 and the disturbance torque 270 applied to the platform by motion of the instrument sonde 10. Disturbance Torques are derived from two sources. First, torques applied to the instrument sonde 10 about the borehole axis are coupled into the rotating platform 22 via the mechanical friction that exists in the slip rings, bearings and resolver components of the platform. Second, a disturbance torque is produced by the product of acceleration, the mass of the platform 22 and the distance that the center of mass of the platform 22 is displaced off its axis of rotation. These disturbance torques are what the rate control servo must overcome to maintain the programmed rate control.

Continuing with the diagram of FIG. 4, platform inertia 310, represents the physical attribute of the platform 22 that determines the dynamic response of both the rate control feedback 350 angle feedback 360, and is the natural stabilizing element of the system. A high inertia resists angular rate increases due to torque disturbances but may increase imbalance effects if the center of mass location in the rotating platform 22 is not carefully controlled.

MEMS gyroscope 34 measures the axial rotation of the platform 22 and provides a rate output used for the negative feedback signal 350 that is applied to the rate summing node 220. In an exemplary embodiment an analog output from MEMS gyroscope 34 is converted into a digital form of the rate control feedback 350 through an A to D converter 280 before application to the rate summing node 220 completing the rate feedback loop. Those skilled in the art will recognize that in alternative embodiments a plurality of methods can be used to implement the feedback including direct analog feedback or direct digital feedback from a digital output MEMS device.

Continuing with the description of the angle feedback signal path in FIG. 4, the angle of the platform 22 with respect to the sonde case is measured using the resolver 38. The resolver output is converted to a digital representation of the platform angle using the resolver to digital converter 288. This digital angle is designated the angle feedback 360. The angle feedback 360 is compared to a command angle 287 supplied by the microcontroller 40 through the microcontroller interface 205 resulting in the angle error signal 291. A compensator 300 processes the error signal 291 to achieve the desired bandwidth and damping of the angle feedback control 360. A limiter process bounds the signal ultimately applied to the rate summing node limiting the rate of rotation of the platform to 10 deg/s. Finally, an enable process schematically shown as a switch 305 controls the application of the rate limiter output to the rate summing node 220 based on commands from the microcontroller 140 through the microcontroller interface 205. This completes the description of the angle feedback signal path.

The embodiment disclosed provides either rate feedback only to space stabilize the platform or both rate feedback and angle feedback based if switch 305 is engaged. In alternative embodiments, feedback from various other sensors such as one or more accelerometers may be employed in a manner similar to the angle feedback for indexing the IMU 30 to gravity or magnetometers for indexing the IMU to a magnetic field such as the Earth Geomagnetic field.

Figure 5:
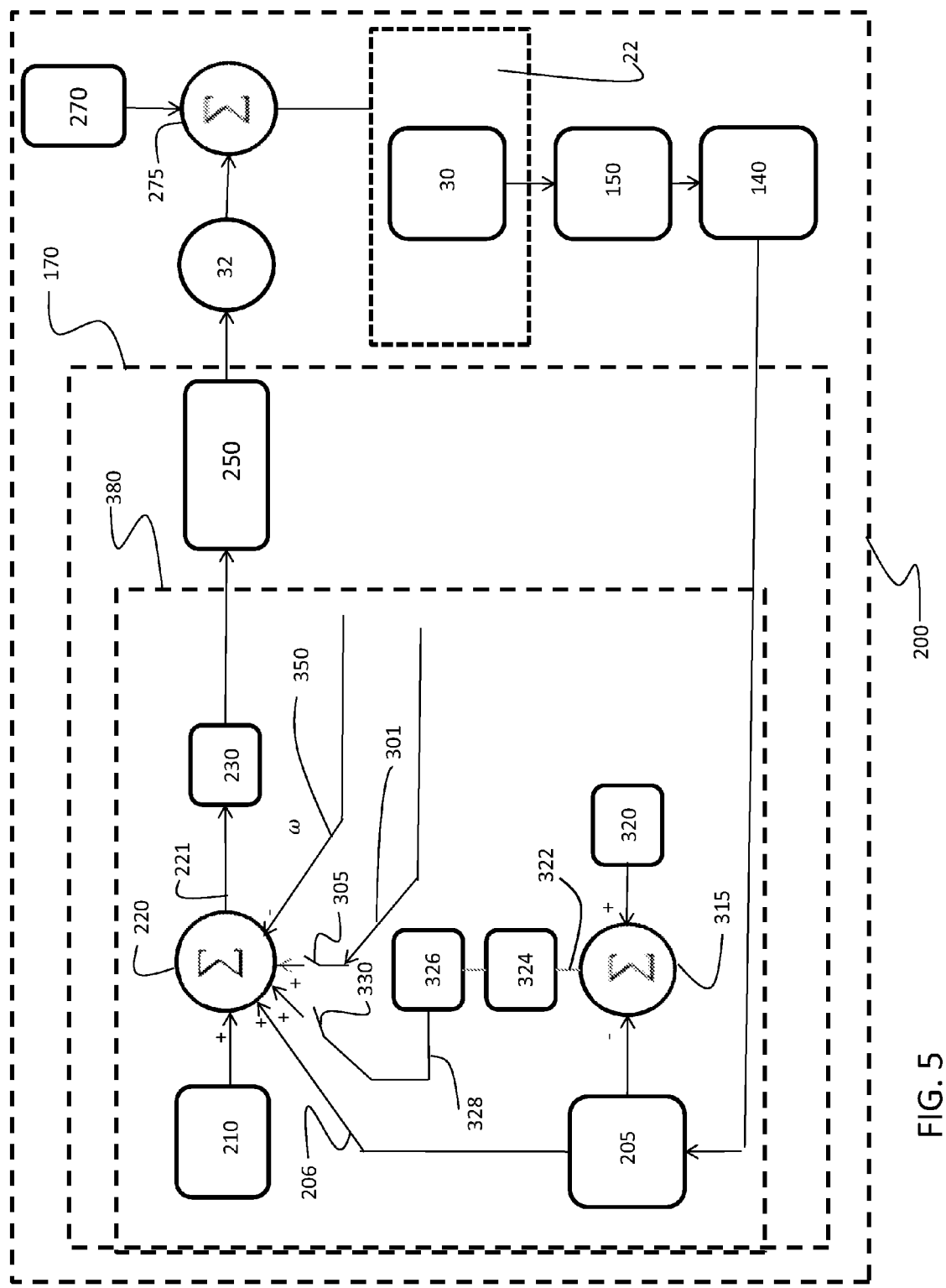
FIG. 5 is a functional block diagram of the platform gravity index control processing.

FIG. 5 diagrams an enhancement to the platform control system 200 used to index the roll axis of the platform and therefore the IMU 30 to a preferred or constant orientation to gravity so that the g-sensitive drifts of gyroscopes 40 can be minimized or held constant during navigation. The rate feedback control 350 for purposes of gravity orientation operates identically as described with respect to FIG. 4 for the rate feedback control from MEMs measurement. The angle feedback control is not enabled when indexing the platform to gravity.

Referencing FIG. 5, IMU 30 mounted on platform 22 is shown. The output of the IMU 30 specifically the measurement output of Z accelerometer 43, previously described in FIGS. 2A, 2B and 2C, is acquired through the data acquisition system 150 by the microcontroller 140. For the example embodiment, the Z accelerometer in the IMU 30 is employed, however, in alternative embodiments, an independent Z axis accelerometer may be employed. Additionally, while specified as the Z axis accelerometer in the embodiment in the drawings, any accelerometer sensing acceleration orthogonal to the tool axis 24, generally defined as an orthogonal accelerometer, may be employed. The microcontroller communicates the accelerometer measurement to the platform processor 380 through the microcontroller interface 205. The magnitude of the accelerometer measurement is compared to a command acceleration 320 creating an error signal 322 used as the input to the roll axis index compensator 324. The compensator output is presented at the input of a limiter process 326 producing the roll axis feedback control 328 that is passed to the summing node 220 through an enabling process represented schematically by the switch 330. The previously described rate feedback control 350 then responds rotating the platform until the roll axis feedback control 328 is driven to zero resulting in the Z accelerometer being pointed such that it outputs a value equivalent to the command acceleration 320 placing the IMU 30 and the associated gyros in a consistent roll attitude with respect to gravity.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A borehole logging instrument sonde comprising:
a case;
support electronics including a processor mounted within the case;
a rotatable platform mounting within the case and carrying
an inertial measurement unit (IMU); and,
a single axis gyroscope mounted to the rotatable platform with a measurement axis aligned with an axis of rotation of the platform;
a motor adapted to rotate the rotatable platform within the case;
said processor receiving an input from the single axis gyroscope and providing an output to the motor responsive to the input.

2. The sonde as defined in claim 1 wherein the rotatable platform is supported by bearings for rotation within the case.

3. The sonde as defined in claim 1 further comprising a slip ring for electrical connection between the IMU, single axis gyroscope and the support electronics.

4. The sonde as defined in claim 1 wherein the processor sums a rate control signal with feedback from the received input to command a rotation rate specified to produce a slow constant rotation of the IMU sensors with respect to gravity and the spin rate of the earth used to enhance estimation of IMU sensor errors using Kalman filters.

5. The sonde as defined in claim 1 wherein the processor sums a rate control signal with feedback from the received input to command a rotation rate of substantially zero to space stabilize and isolate the IMU from the roll of the instrument sonde.

6. The sonde as defined in claim 5 wherein the single axis gyroscope is a high bandwidth high dynamic range gyroscope and the IMU is a high accuracy, low dynamic range and bandwidth IMU.

7. The sonde as defined in claim 1 further comprising an angular resolver determining angle between the case and rotatable platform, said processor receiving a second input from the angular resolver.

8. The sonde as defined in claim 7 wherein the processor determines a rate control signal with feedback from the received roll single axis gyroscope input in a first summer and additionally determines a difference between a command angle and second input from the resolver in a second summer and provides an intermediate output through an angle control compensator to the first summer producing a rate limited output.

9. The sonde as defined in claim 7 wherein the processor determines a rate control signal with feedback from the received single axis gyroscope input in a first summer and additionally determines a difference between a gravity command reference and second input from an orthoganol accelerometer in a second summer and provides an intermediate output through a gravity compensator to the first summer producing a rate limited output.

10. An inertial measurement unit (IMU) stabilization apparatus comprising:
a rotatable platform housed within an instrument sonde case having a roll axis;
an IMU mounted to the platform;
a single axis gyroscope mounted on the platform with a measurement axis aligned with an axis of rotation of the platform;
a motor engaged to the platform for rotation of the platform in the roll axis; and,
a processor receiving an input from the single axis gyroscope and providing a control signal to the motor to rotate the platform to reduce rotation in the axis of rotation of the platform.

11. The IMU stabilization apparatus as defined in claim 10 wherein the platform is supported by bearings for rotation within the case.

12. The IMU stabilization apparatus as defined in claim 10 wherein the processor sums a rate control signal with feedback from the received input to command a rotation rate of substantially zero to space stabilize and isolate the IMU from the roll of the instrument sonde.

13. The IMU stabilization apparatus as defined in claim 10 wherein the processor sums a rate control signal with feedback from the received input to command a rotation rate specified to produce a slow constant rotation of the IMU sensors with respect to gravity and the spin rate of the earth to enhance estimation of IMU sensor errors using Kalman filters.

14. The IMU stabilization apparatus as defined in claim 10 further comprising a slip ring for electrical connection between the IMU, single axis gyroscope and the support electronics.

15. The IMU stabilization apparatus as defined in claim 10 further comprising an angular resolver determining angle between the case and rotatable platform, said processor receiving a second input from the angular resolver.

16. The IMU stabilization apparatus as defined in claim 15 wherein the processor determines a rate control signal with feedback from the received single axis gyroscope input in a first summer and additionally determines a difference between a command angle and second input from the resolver in a second summer and provides an intermediate output through an angle control compensator to the first summer producing a rate limited output.

17. The IMU stabilization apparatus as defined in claim 15 wherein the processor determines a rate control signal with feedback from the received roll axis gyroscope input in a first summer and additionally determines a difference between a gravity command angle and second input from an orthogonal accelerometer in a second summer and provides an intermediate output through a gravity compensator to the first summer producing a rate limited output.

18. A method for space stabilization and isolation of an IMU from the roll of an instrument sonde comprising:
mounting an IMU on a rotatable platform suspended on bearings in an instrument sonde;
mounting a single axis gyroscope in the platform with a measurement axis aligned with an axis of rotation of the platform;
providing an input from the single axis gyroscope to a processor;
driving a motor with an output from the processor responsive to the roll axis gyroscope input.

19. The method of claim 18 wherein the step of driving a motor further comprises commanding a rotation rate of substantially zero to space stabilize and isolate the IMU from the roll of the instrument sonde.

20. The method of claim 18 wherein the step of driving a motor further comprises commanding a rotation rate specified to produce a slow constant rotation of the IMU sensors with respect to gravity and the spin rate of the earth to enhance estimation of IMU sensor errors using Kalman filters.

21. The method of claim 18 further comprising:
mounting an angle resolver on the rotatable platform;
providing a second input to the processor from the angle resolver;
and wherein the step of driving a motor further comprises:
determining a rate control signal with feedback from the received single axis gyroscope input in a first summer;
determining a difference between a command angle and the second input from the resolver in a second summer; and
providing an intermediate output through an angle control compensator to the first summer producing a rate limited output.

22. The method of claim 18 further comprising:
receiving an orthogonal acceleration input from the rotatable platform;
providing a second input to the processor from the Z acceleration input;
and wherein the step of driving a motor further comprises:
determining a rate control signal with feedback from the received roll axis gyroscope input in a first summer;
determining a difference between a gravity command acceleration and the second input from the orthogonal acceleration input in a second summer; and
providing an intermediate output through an angle control compensator to the first summer producing a rate limited output.

* * * * *